United States Patent
Yamamoto et al.

(10) Patent No.: US 12,473,394 B2
(45) Date of Patent: Nov. 18, 2025

(54) URETHANE COMPOUND

(71) Applicant: DAIKIN INDUSTRIES, LTD., Osaka (JP)

(72) Inventors: Ikuo Yamamoto, Osaka (JP); Shinichi Minami, Shanghai (CN); Bin Zhou, Shanghai (CN)

(73) Assignee: DAIKIN INDUSTRIES, LTD., Osaka (JP)

( * ) Notice: Subject to any disclaimer, the term of this patent is extended or adjusted under 35 U.S.C. 154(b) by 563 days.

(21) Appl. No.: 17/964,526

(22) Filed: Oct. 12, 2022

(65) Prior Publication Data

US 2023/0050864 A1 Feb. 16, 2023

Related U.S. Application Data

(63) Continuation of application No. PCT/JP2021/015176, filed on Apr. 12, 2021.

(30) Foreign Application Priority Data

Apr. 13, 2020 (CN) .................. 202010284458.X

(51) Int. Cl.
| | | |
|---|---|---|
| *C08G 18/48* | (2006.01) |
| *C08G 18/28* | (2006.01) |
| *C08G 18/80* | (2006.01) |
| *C09D 175/08* | (2006.01) |
| *D06M 15/277* | (2006.01) |
| *D06M 15/564* | (2006.01) |
| *D06M 101/06* | (2006.01) |
| *D06M 101/34* | (2006.01) |

(52) U.S. Cl.
CPC ......... *C08G 18/285* (2013.01); *C08G 18/283* (2013.01); *C08G 18/48* (2013.01); *C08G 18/8058* (2013.01); *C09D 175/08* (2013.01); *D06M 15/277* (2013.01); *D06M 15/564* (2013.01); *D06M 2101/06* (2013.01); *D06M 2101/34* (2013.01); *D06M 2200/11* (2013.01); *D06M 2200/12* (2013.01)

(58) Field of Classification Search
CPC .... C08G 18/285; C08G 18/283; C08G 18/48; C08G 18/8058; C09D 175/08; D06M 15/277; D06M 15/564; D06M 2101/06; D06M 2101/34; D06M 2200/11; D06M 2200/12

See application file for complete search history.

(56) References Cited

U.S. PATENT DOCUMENTS

| | | | |
|---|---|---|---|
| 6,270,561 B1 * | 8/2001 | Nguyen | C09D 11/10 |
| | | | 524/588 |
| 2008/0194757 A1 | 8/2008 | Fujita et al. | |
| 2012/0295503 A1 | 11/2012 | Uesugi et al. | |
| 2019/0309174 A1 | 10/2019 | Glas et al. | |

FOREIGN PATENT DOCUMENTS

| | | |
|---|---|---|
| JP | 2013-511574 A | 4/2013 |
| JP | 2014-210882 A | 11/2014 |
| JP | 2017-196852 A | 11/2017 |
| JP | 2019-519653 A | 7/2019 |
| WO | 98/14493 A1 | 4/1998 |
| WO | 2006/038466 A1 | 4/2006 |

OTHER PUBLICATIONS

International Preliminary Report on Patentability dated Oct. 13, 2022 with a Translation of the Written Opinion of the International Searching Authority in Application No. PCT/JP2021/015176.
Extended European Search Report dated Mar. 21, 2024 in Application No. 21789359.3.
International Search Report for PCT/JP2021/015176 dated Jun. 29, 2021 [PCT/ISA/210].

* cited by examiner

*Primary Examiner* — Jiangtian Xu
(74) *Attorney, Agent, or Firm* — Sughrue Mion, PLLC

(57) ABSTRACT

A urethane compound (A) including units formed from (A1) an isocyanate and (A2) a long-chain alcohol represented by the formula HO—Z(Y—R)$_n$ [wherein the R moieties are each independently —O—, —NH—, —O—C(=O)—, —NH—C(=O)—, —C(=O)—NH—, —O—C(=O)—NH—, —NH—C(=O)—O—, —NH—C(=O)—NH—, —NH—S(=O)$_2$—, —S(=O)$_2$—NH—, —NH—(CH$_2$)$_m$—NH—S(=O)$_2$—, —NH—(CH$_2$)$_m$—S(=O)$_2$—NH—, etc. (m is an integer of 1-5), Z is a direct bond or a di- or trivalent hydrocarbon group having 1-5 carbon atoms, and n is 1 or 2]. Also disclosed is a urethane mixture containing the urethane compound (A), and at least one selected from the polyisocyanate (A1), the long-chain alcohol (A2), a blocking agent (A3) and an alcohol compound (A4); an aqueous urethane composition; a method for producing the aqueous urethane composition; a method of treating a substrate; and a treated textile product.

12 Claims, No Drawings

URETHANE COMPOUND

CROSS REFERENCE TO RELATED APPLICATIONS

This application is a Rule 53(b) Continuation of International Application No. PCT/JP2021/015176 filed Apr. 12, 2021, claiming priority from Chinese Patent Application No. CN 202010284458.X filed Apr. 13, 2020, the above-noted applications being incorporated herein by reference in their respective entireties.

TECHNICAL FIELD

The present disclosure relates to a urethane compound and an aqueous urethane composition comprising a urethane compound.

BACKGROUND ART

A demand exists for high-performance repellents such as fluorine-containing repellents and fluorine-free repellents. Examples of additives for assisting water-repellency include cross-linking agents. Principal cross-linking agents are isocyanate-based cross-linking agents such as isocyanate cross-linking agents characterized by a blocking agent.

Patent Literature 1 (WO 2006/038466 A1) discloses a water-dispersible polyurethane composition comprising polyisocyanate represented by a specific chemical formula as an essential component.

Patent Literature 2 (JP 2014-210882 A) discloses a block polyisocyanate composition having a polyisocyanate unit, a polyethylene oxide unit having a hydroxyl group at one end, and a blocking-agent unit, wherein a ratio of the number of allophanate groups/the number of isocyanurate groups is 30/100 to 200/100.

PRIOR ARTS DOCUMENT

Patent Literature

Patent Literature 1: WO 2006/038466 A1
Patent Literature 2: JP 2014-210882 A

SUMMARY OF INVENTION

Technical Problem

It cannot necessarily be said that conventional cross-linking agents are capable of sufficiently assisting water- and oil-repellency, and thus a higher-performance cross-linking agent assisting a washing durability is desired.

Solution to Problem

The present disclosure provides a urethane compound formed from a long-chain alcohol having a hydrocarbon group having 7 to 40 carbon atoms.

Preferable embodiments of the present disclosing are as follows:

Embodiment 1

A urethane compound (A) comprising units formed from:
(A1) an isocyanate, and
(A2) a long-chain alcohol represented by the formula:

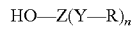

HO—Z(Y—R)$_n$ wherein
R is each independently a hydrocarbon group having 7 to 40 carbon atoms,
Y is each independently —O—, —NH—, —NH—C(=O)—, —C(=O)—NH—, —NH—C(=O)—O—, —NH—C(=O)—NH—, —C$_6$H$_4$—, —NH—(CH$_2$)$_m$—NH—, —NH—(CH$_2$)$_m$—O—, —O—C(=O)—, —C(=O)—O—, —NH—(CH$_2$)$_m$—O—C(=O)—, —NH—(CH$_2$)$_m$—C(=O)—O—, —O—C(=O)—NH—, —O—C$_6$H$_4$—, —NH—S(=O)$_2$—, —S(=O)$_2$—NH—, —NH—(CH$_2$)$_m$—O—C(=O)—NH—, —NH—(CH$_2$)$_m$—NH—C(=O)—O—, —NH—(CH$_2$)$_m$—C(=O)—NH—, —NH—(CH$_2$)$_m$—NH—C(=O)—, —NH—(CH$_2$)$_m$—NH—C(=O)—NH—, —NH—(CH$_2$)$_m$—O—C$_6$H$_4$—, —NH—(CH$_2$)$_m$—NH—C$_6$H$_4$—, —NH—(CH$_2$)$_m$—NH—S(=O)$_2$—, or —NH—(CH$_2$)$_m$—S(=O)$_2$—NH—,
wherein m is an integer of 1 to 5,
Z is a direct bond or a divalent or trivalent hydrocarbon group having 1 to 5 carbon atoms, and
n is 1 or 2.

Embodiment 2

The urethane compound according to embodiment 1, further comprising a unit formed from at least one selected from:
(A3) a blocking agent, and
(A4) an alcohol compound.

Embodiment 3

The urethane compound according to embodiment 1 or 2, wherein the isocyanate (A1) is at least one selected from tolylene diisocyanate (TDI), diphenylmethane diisocyanate (MDI), an MDI oligomer, naphthalene-1,5-diisocyanate, xylylene diisocyanate, hexamethylene diisocyanate (HDI), 4,4-dicyclohexylmethane diisocyanate, norbornane diisocyanate, isophorone diisocyanate (IPDI), an adduct of diisocyanate, an allophanate-modified product, a biuret-modified product, an isocyanurate-modified product or a carbodiimide-modified product, and a urethane prepolymer.

Embodiment 4

The urethane compound according to any one of embodiments 1 to 3, wherein the long-chain alcohol (A2) is at least one selected from:
HO—(CH$_2$)$_m$—NH—C(=O)—R,
HO—(CH$_2$)$_m$—C(=O)—NH—R,
HO—(CH$_2$)$_m$—O—C(=O)—R,
HO—(CH$_2$)$_m$—C(=O)—O—R,
HO—(CH$_2$)$_m$—NH—C(=O)—O—R,
HO—(CH$_2$)$_m$—O—C(=O)—NH—R,
HO—(CH$_2$)$_m$—NH—C(=O)—NH—R,
HO—(CH$_2$)$_m$—NH—S(=O)$_2$—R, and
HO—(CH$_2$)$_m$—S(=O)$_2$—NH—R,
wherein R is a hydrocarbon group having 12 to 30 carbon atoms, and m is an integer of 1 to 5.

Embodiment 5

The urethane compound according to any one of embodiments 2 to 4, wherein the blocking agent (A3) is at least one selected from oxime, phenol, alcohol, mercaptan, amide, imide, imidazole, urea, amine, imine, pyrazole, and an active methylene compound.

3

Embodiment 6

The urethane compound according to any one of embodiments 2 to 5, wherein
the alcohol compound (A4) is a monool or a polyol,
the monool is a compound obtained by adding a $C_2$ or $C_3$ alkylene oxide to a starting monoalcohol having 1 to 10 carbon atoms, and
the polyol is a diol or a polyol having 3 or more hydroxyl groups, and is at least one selected from a low molecular weight polyol, a polyether polyol, a polyester polyol, a polyester polycarbonate polyol, and a crystalline or non-crystalline polycarbonate polyol.

Embodiment 7

A urethane mixture comprising the urethane compound according to any one of embodiments 1 to 6 and at least one selected from the group consisting of the polyisocyanate (A1), the long-chain alcohol (A2), the blocking agent (A3), and the alcohol compound (A4).

Embodiment 8

An aqueous urethane composition comprising:
(A) the urethane compound according to any one of embodiments 1 to 6, and
(B) water.

Embodiment 9

The aqueous urethane composition according to embodiment 8, wherein the aqueous urethane composition is an aqueous dispersion.

Embodiment 10

The aqueous urethane composition according to embodiment 8 or 9, wherein the aqueous urethane composition is a cross-linking agent or an adjuvant.

Embodiment 11

A method for producing the aqueous urethane composition according to any one of embodiments 8 to 10, the method comprising:
mixing the isocyanate (A1) and the long-chain alcohol (A2) in an organic solvent to react the isocyanate (A1) and the long-chain alcohol (A2), and subsequently mixing the reaction product with water.

Embodiment 12

A method for treating a substrate, the method comprising:
treating a substrate with a surface-treating composition comprising the urethane compound according to any one of embodiments 1 to 6.

Embodiment 13

A treated textile product, comprising the urethane compound according to any one of embodiments 1 to 6 attached as a crosslinked product to a treatment substrate.

Advantageous Effects of Invention

According to the present disclosure, a urethane compound which functions as an adjuvant for enhancing the performance of a surface-treating agent such as a water- and oil-repellent agent is obtained. The urethane compound assists the surface-treating agent to impart high water- and oil-repellency. Due to the urethane compound, high washing durability is obtained, and, particularly, high washing durability with respect to water-repellency is obtained.

DESCRIPTION OF EMBODIMENTS

The present disclosure relates to an aqueous urethane composition comprising:
(A) a urethane compound, and
(B) water.
The urethane compound (A) is formed from:
(A1) a polyisocyanate, and
(A2) a long-chain alcohol represented by the formula:

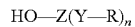

wherein
R is each independently a hydrocarbon group having 7 to 40 carbon atoms,
Y is each independently —O—, —NH—, —NH—C(=O)—, —C(=O)—NH—, —NH—C(=O)—O—, —NH—C(=O)—NH—, —$C_6H_4$—, —NH—$(CH_2)_m$—NH—, —NH—$(CH_2)_m$—O—, —O—C(=O)—, —C(=O)—O—, —NH—$(CH_2)_m$O—C(=O)—, —NH—$(CH_2)_m$—C(=O)—O—, —O—C(=O)—NH—, —O—$C_6H_4$—, —NH—S(=O)$_2$—, —S(=O)$_2$—NH—, —NH—$(CH_2)_m$—O—C(=O)—NH—, —NH—$(CH_2)_m$—NH—C(=O)—O—, —NH—$(CH_2)_m$—C(=O)—NH—, —NH—$(CH_2)_m$—NH—C(=O)—, —NH—$(CH_2)_m$—NH—C(=O)—NH—, —NH—$(CH_2)_m$—O—$C_6H_4$—, —NH—$(CH_2)_m$NH—$C_6H_4$—, —NH—$(CH_2)_m$—NH—S(=O)$_2$—, or —NH—$(CH_2)_m$—S(=O)$_2$—NH—,
wherein m is an integer of 1 to 5,
Z is a direct bond or a divalent or trivalent hydrocarbon group having 1 to 5 carbon atoms, and
n is 1 or 2.

That is to say, the urethane compound (A) has a unit formed from the polyisocyanate (A1) and a unit formed from the long-chain alcohol (A2).

The urethane compound (A) may further have a unit formed from at least one selected from:
(A3) a blocking agent, and
(A4) an alcohol compound.

The urethane compound (A) preferably has both of a unit formed from the blocking agent (A3) and a unit formed from the alcohol compound (A4).

The urethane compound (A) may be formed from the following components:
component (A1)+component (A2)
component (A1)+component (A2)+component (A3)
component (A1)+component (A2)+component (A4) or
component (A1)+component (A2)+component (A3)+component (A4).

In the present disclosure, any of the polyisocyanate (A1), the long-chain alcohol (A2), the blocking agent (A3), and the alcohol compound (A4) may be at least partially unreacted. Accordingly, the present disclosure provides a urethane mixture comprising the urethane compound (A) and at least one selected from the group consisting of the polyisocyanate (A1), the long-chain alcohol (A2), the blocking agent (A3), and the alcohol compound (A4).

Examples of the polyisocyanate (A1) include tolylene diisocyanate (TDI), diphenylmethane diisocyanate (MDI), an MDI oligomer, naphthalene-1,5-diisocyanate, xylylene diisocyanate, hexamethylene diisocyanate (HDI), 4,4-dicyclohexylmethane diisocyanate, norbornane diisocyanate, isophorone diisocyanate (IPDI), an adduct of diisocyanate, an allophanate-modified product, a biuret-modified product, an isocyanurate-modified product or a carbodiimide-modified product, and a urethane prepolymer.

The polyisocyanate (A1) is preferably a diisocyanate.

The polyisocyanate (A1) is preferably a compound represented by the formula:

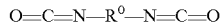

O=C=N—R⁰—N=C=O wherein $R^0$ is a divalent organic group.

$R^0$ is a group remaining after an isocyanate group is removed from polyisocyanate. $R^0$ may be, for example, a hydrocarbon group having 3 to 30 carbon atoms, for example, 4 to 20 or 5 to 15 carbon atoms.

In the long-chain alcohol (A2), R is preferably a linear or branched hydrocarbon group. Particularly, the hydrocarbon group may be a linear hydrocarbon group. The hydrocarbon group is preferably an aliphatic hydrocarbon group, particularly a saturated aliphatic hydrocarbon group, and especially an alkyl group. The number of carbon atoms of the hydrocarbon group is preferably 12 to 30, and more preferably 16 to 22.

In the long-chain alcohol (A2), Y may be —O—, —NH—, —NH—C(=O)—, —C(=O)—NH—, —NH—C(=O)—O—, —NH—C(=O)—NH—, —C₆H₄—, —NH—(CH₂)$_m$—NH—, —NH—(CH₂)$_m$—O—, —O—C(=O)—, —C(=O)—O—, —NH—(CH₂)$_m$—O—C(=O)—, —NH—(CH₂)$_m$—C(=O)—O—, —O—C(=O)—NH—, —O—C₆H₄—, —NH—S(=O)₂—, —S(=O)₂—NH—, —NH—(CH₂)$_m$—O—C(=O)—NH—, —NH—(CH₂)$_m$—NH—C(=O)—O—, —NH—(CH₂)$_m$—C(=O)—NH—, —NH—(CH₂)$_m$—NH—C(=O)—, —NH—(CH₂)$_m$NH—C(=O)—NH—, —NH—(CH₂)$_m$—O—C₆H₄—, —NH—(CH₂)$_m$—NH—C₆H₄—, —NH—(CH₂)$_m$—NH—S(=O)₂—, or —NH—(CH₂)$_m$—S(=O)₂—NH—, wherein m is 1 to 5, and particularly 2 or 4.

Y is preferably —O—, —NH—, —O—C(=O)—, —NH—C(=O)—, —C(=O)—NH—, —O—C(=O)—NH—, —NH—C(=O)—O—, —NH—C(=O)—NH—, —NH—S(=O)₂—, —S(=O)₂—NH—, —NH—(CH₂)$_m$—NH—S(=O)₂—, or —NH—(CH₂)$_m$—S(=O)₂—NH—, wherein m is an integer of 1 to 5, and particularly 2 or 4. Y is more preferably —NH—C(=O)— or —C(=O)—NH—.

In the long-chain alcohol (A2), Z is a direct bond or a divalent or trivalent hydrocarbon group having 1 to 5 carbon atoms, and may have a linear structure or a branched structure. The number of carbon atoms of Z is preferably 2 to 4, and particularly 2. Specific examples of Z include a direct bond, —CH₂—, —CH₂CH₂—, —CH₂CH₂CH₂—, —CH₂CH₂CH₂CH₂—, —CH₂CH₂CH₂CH₂CH₂—, —CH₂CH= having a branched structure, —CH₂(CH—)CH₂— having a branched structure, —CH₂CH₂CH= having a branched structure, —CH₂CH₂CH₂CH₂CH= having a branched structure, —CH₂CH₂(CH—)CH₂— having a branched structure, and —CH₂CH₂CH₂CH= having a branched structure. Z is preferably —CH₂CH₂—, —CH₂CH₂CH₂—, or —CH₂CH₂CH₂CH₂—.

Z is preferably not a direct bond.

Preferable specific examples of the long-chain alcohol (A2) are as follows:

HO—(CH₂)$_m$—NH—C(=O)—R,
HO—(CH₂)$_m$—C(=O)—NH—R,
HO—(CH₂)$_m$—O—C(=O)—R,
HO—(CH₂)$_m$—C(=O)—O—R,
HO—(CH₂)$_m$—NH—C(=O)—O—R,
HO—(CH₂)$_m$—O—C(=O)—NH—R,
HO—(CH₂)$_m$—NH—C(=O)—NH—R,
HO—(CH₂)$_m$—NH—S(=O)₂—R, and
HO—(CH₂)$_m$—S(=O)₂—NH—R, wherein R is a hydrocarbon group having 7 to 40 carbon atoms, and m is an integer of 1 to 5.

The blocking agent (A3) is a compound which masks the isocyanate groups of polyisocyanate to suppress the reaction of the isocyanate groups. Examples of the blocking agent (A3) include oxime, phenol, alcohol, mercaptan, amide, imide, imidazole, urea, amine, imine, pyrazole, and an active methylene compound. Other examples of the blocking agent (A3) include pyridinol, thiophenol, diketone, and ester. The blocked polyisocyanate (the block isocyanate compound) may be modified with a compound having a hydrophilic group. The blocking agent (A3) is preferably oxime, pyrazole, or an active methylene compound because of increased water-repellency and oil-repellency.

Due to the presence of the blocking agent, the washing durability for water-repellency is increased.

Examples of the oxime include formamidoxime, acetaldoxime, acetoxime, methyl ethyl ketoxime, and cyclohexanone oxime.

Examples of the phenol include phenol optionally having at least one (preferably one or two) $C_{1-10}$ alkyl group. Specific Examples of the phenol include phenol; monoalkylphenol (such as cresol, ethylphenol, propylphenol, butylphenol, hexylphenol, 2-ethylhexylphenol, and octylphenol); and dialkylphenol (such as diethylphenol, dipropylphenol, dipropylcresol, dibutylphenol, di-2-ethylhexylphenol, dioctylphenol, and dinonylphenol).

Additional specific Examples of the phenol include styrenated phenol and hydroxybenzoate ester.

Examples of the alcohol include (preferably monovalent) alcohol (particularly, alkanol) having a $C_1$-$C_{30}$ alkyl group.

Specific Examples of the alcohol include methanol, ethanol, propanol, 1-butanol, sec-butanol, 2-ethyl-1-hexanol, 2-methoxyethanol, 2-butoxyethanol, 2-methoxy-1-propanol, and 3-methyl-2-penten-4-yn-1-ol.

Specific Examples of the mercaptan include butyl mercaptan and dodecyl mercaptan.

Specific Examples of the amide (preferably acidic amide) include acetanilide, acetic acid amide, β-propiolactam, γ-butyrolactam, δ-valerolactam, ε-caprolactam, laurolactam, stearolactam, N-methyl-ε-caprolactam, and pyrrolidinone.

Specific Examples of the imide include acid imide such as maleic acid imide and succinic acid imide.

Specific Examples of the imidazole include imidazole and 2-methylimidazole.

Specific Examples of the urea include urea, thiourea, and ethyleneurea.

Specific Examples of the amine include diphenylamine, aniline, carbazole, diethylamine, dipropylamine, and propylethylamine.

Specific Examples of the imine include ethyleneimine and polyethyleneimine.

Specific Examples of the pyrazole include 2-methyl-pyrazole, 3-methyl-pyrazole, 4-methyl-pyrazole, 2,4-dimethyl-pyrazole, 2,5-dimethyl-pyrazole, 3,4-dimethyl-pyrazole, 3,5-dimethyl-pyrazole, 4-nitro-3,5-dimethyl-pyrazole, and 4-bromo-3,5-dimethyl-pyrazole.

Examples of the active methylene compound include a malonate ester (such as a malonic acid ester of $C_{1-30}$ alkyl), an acetoacetic acid ester (such as an acetoacetic acid ester of $C_{1-30}$ alkyl), and acetylacetone.

The blocking agent for forming a block isocyanate compound is preferably a pyrazole compound or a malonate ester compound, and particularly a pyrazole compound.

The pyrazole compound may be represented by the formula:

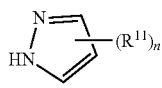

wherein each $R^{11}$ is, the same or different, an alkyl group, an alkenyl group, an aralkyl group, an N-substituted carbamyl group, a phenyl group, $NO_2$, a halogen atom, or a $-C(=O)OR^{12}$ group (wherein $R^{12}$ is an alkyl group having 1 to 4 carbon atoms), and n is 0, 1, 2, or 3.

Specific examples of the pyrazole compound include 2-methyl-pyrazole, 3-methyl-pyrazole, 4-methyl-pyrazole, 2,4-dimethyl-pyrazole, 2,5-dimethyl-pyrazole, 3,4-dimethyl-pyrazole, 3,5-dimethyl-pyrazole, 4-nitro-3,5-dimethyl-pyrazole, and 4-bromo-3,5-dimethyl-pyrazole.

The malonate ester compound is a reaction product (a monoester or a diester (preferably a diester)) of malonic acid and an alcohol (such as a monohydric alcohol). In general, the alcohol has a hydrocarbon group having 1 to 30 carbon atoms and bonded to a hydroxyl group. The hydrocarbon group is preferably an alkyl group, and particularly an alkyl group having 1 to 4 carbon atoms.

Specific examples of the malonate ester include dimethyl malonate, diethyl malonate, dipropyl malonate, dibutyl malonate, methyl malonate, ethyl malonate, propyl malonate, and butyl malonate. Diesters are preferable. Preferable specific examples of the malonate ester include dimethyl malonate, diethyl malonate, dipropyl malonate, and dibutyl malonate.

The alcohol compound (A4) may be a monool or a polyol.

The monool is preferably a compound obtained by adding $C_2$ or $C_3$ alkylene oxide to a starting monoalcohol having 1 to 10 carbon atoms (such as methanol).

The polyol may be a diol or a polyol having 3 or more hydroxyl groups. The polyol may be a low molecular weight polyol, a polyether polyol, a polyester polyol, a polyester polycarbonate polyol, or a crystalline or non-crystalline polycarbonate polyol.

The alcohol compound (A4) preferably has a hydrophilic group in addition to a hydroxyl group. The hydrophilic group is not consumed by a urethane reaction. Examples of the hydrophilic group include a $C_2$ or $C_3$ alkylene oxide group and an amino group.

Since the molecular weight of the urethane compound is increased by cross-linking, the alcohol compound (A4) may consist of the monool alone.

The urethane compound has an $R^0$ group derived from the polyisocyanate (A1) and a $-Z(Y-R)_n$ group derived from the long-chain alcohol (A2), and, preferably, further has a group derived from the blocking agent (A3) and/or a group derived from the alcohol compound (A4).

The total amount of the long-chain alcohol (A2) and the alcohol compound (A4) may be such an amount that the isocyanate index [the equivalent ratio of isocyanate groups in polyisocyanate to active hydrogen groups in alcohol] is 2 to 0.5, preferably 1.5 to 0.8, and particularly 1.2 to 0.9. The molar ratio of the long-chain alcohol (A2) to the alcohol compound (A4) may be 10:90 to 100:0 or 10:90 to 90:10, for example, 20:80 to 80:20, and particularly 30:70 to 70:30.

The amount (the equivalent ratio) of the blocking agent (A3) may be 1 to 50 eq %, for example, 2 to 30 eq %, and particularly 3 to 20 eq %, based on the equivalent of isocyanate groups in polyisocyanate.

The aqueous urethane composition comprises the urethane compound (A) and water (B). The amount of water (B) may be such an amount that the amount of the urethane compound (A) is 0.1 to 70% by weight, for example, 1 to 50% by weight, based on the aqueous urethane composition. The aqueous urethane composition may comprise an organic solvent, and the amount of the organic solvent may be 200 parts by weight or less, for example, 1 to 50 parts by weight, based on 100 parts by weight of water (B).

The aqueous urethane composition is preferably an aqueous dispersion. The aqueous urethane composition is preferably self-emulsifying. The aqueous urethane composition may comprise an emulsifier (in an amount of 0.1 to 10 parts by weight, based on 100 parts by weight of the urethane compound (A)), and preferably does not comprise an emulsifier.

The urethane compound (A) can be produced by reacting the polyisocyanate (A1) with the long-chain alcohol (A2) and, optionally, the alcohol compound (A4) and, as necessary, the blocking agent (A3).

The aqueous urethane composition can be produced by mixing the polyisocyanate (A1) and the long-chain alcohol (A2) in an organic solvent to react the polyisocyanate (A1) and the long-chain alcohol (A2), and subsequently adding water. Alternatively, the aqueous urethane composition can be produced by mixing the polyisocyanate (A1), the long-chain alcohol (A2), and the alcohol compound (A4) in an organic solvent to react the polyisocyanate (A1), the long-chain alcohol (A2), and the alcohol compound (A4), further, reacting the blocking agent (A3), and subsequently adding water. The organic solvent may be removed after adding water.

The temperature and the time for reacting the long-chain alcohol (A2) and the alcohol compound (A4) with the polyisocyanate (A1) may be 0 to 60° C. and 1 minute to 24 hours, respectively. The temperature and the time for reacting the blocking agent (A3) may be 30 to 120° C. and 1 minute to 24 hours, respectively.

The urethane compound (A) (and the aqueous urethane composition) can serve as a cross-linking agent or an adjuvant. The "adjuvant" means an agent which assists the performance of a surface-treating agent (an agent which enhances water- and oil-repellency, antifouling properties, soil releasability, peelability, and/or mold releasability, and particularly an agent which enhances water- and oil-repellency), or an agent which modifies the treatment substrate (particularly an agent modifying a textile product, such as an agent enhancing the texture of a textile product), or an agent assisting the stable processing during treatment with a surface-treating agent.

By mixing the aqueous urethane composition and a surface-treating agent, a surface-treating composition can be obtained.

The surface-treating agent to be mixed with the urethane compound (A) may be any surface-treating agent, and may be a fluorine-based, silicon-based, urethane-based, acryl-based, or like surface-treating agent. The surface-treating agent may be in the form of a solution, an emulsion (particularly an aqueous dispersion), or an aerosol, and is preferably an aqueous dispersion. Examples of the active component of the surface-treating agent include a fluorine-containing polymer, a silicon-containing polymer, polyurethane, and a fluorine-free, silicon-free polymer. In the surface-treating composition, the amount of the urethane compound (A) may be 1 to 100 parts by weight and particularly 5 to 50 parts by weight, based on 100 parts by weight of the active component of the surface-treating agent.

The surface-treating composition can be used as a water repellent agent, an oil repellent agent, a soil resistant agent, a soil release agent, a peeling agent, and a mold release agent.

The surface-treating composition can be applied to the treatment substrate by a conventionally known method. Usually, a method, in which the treatment agent is dispersed in water (and/or an organic solvent) to be diluted, then attached to the surface of the treatment substrate by a known method, for example, dip coating, spray coating, or foam coating, and dried, is employed. Curing is preferably performed. The curing temperature may be 60 to 250° C. and particularly 100 to 200° C., and the curing time may be 1 second to 10 minutes and particularly 10 seconds to 3 minutes. Moreover, an insect repellent, a softening agent, an antibacterial agent, a flame retarder, an antistatic agent, a coating material fixative, a wrinkle-resistant agent, or the like may be added to and concomitantly used in the surface-treating composition. The concentration of the urethane compound in the treatment liquid to be brought into contact with a substrate may be 0.01 to 10% by weight (particularly, in the case of dip coating), for example, 0.05 to 10% by weight.

Examples of the treatment substrate to be treated with the surface-treating composition (such as a water- and oil-repellent agent) include textile products, stone, filters (such as electrostatic filters), dust masks, fuel cell components (such as gas diffusion electrodes and gas diffusion supports), glass, paper, wood, leather, fur, asbestos, brick, cement, metal and oxide, ceramic products, plastics, coating surfaces, and plaster. Textile products have various examples. Examples include animal- and plant-derived natural fibers such as cotton, linen, wool, and silk, synthetic fibers such as polyamide, polyester, polyvinyl alcohol, polyacrylonitrile, polyvinyl chloride, and polypropylene, semi-synthetic fibers such as rayon and acetate, inorganic fibers such as glass fiber, carbon fiber, and asbestos fiber, and mixed fibers thereof.

The textile product may be in any of the fiber, fabric, and like form.

The surface-treating composition can impart the desired separability to the surface of a substrate. Accordingly, the surface of a substrate can be readily separated from another surface (another surface of said substrate or the surface of another substrate).

Examples of substrates to which the surface-treating composition is applied include textile products (such as non-woven fabric and woven fabric), paper, stone, leather, resin, glass, and metal. The substrate is preferably fabric or paper.

The surface-treating composition can be used for separation between substrates of the same kind (such as fabric and fabric, and paper and paper) or substrates of different kinds (such as fabric and resin, fabric and metal, paper and fabric, and paper and glass). The surface-treating composition can be used in, for example, the production of a protective material for the adhesive surface of an adhesive sheet and an adhesive tape, a mold release film, a mold release paper, and a sticky note.

The surface-treating composition can also be used as an internal mold release agent or an external mold release agent.

The urethane compound can be applied to a fibrous substrate (such as a textile product) by any of the methods known to treat a textile product with a liquid. When the textile product is a fabric, the fabric may be dipped in a solution, or the solution may be attached or sprayed onto the fabric. The treated textile product is dried and preferably heated at, for example, 100° C. to 200° C. to exert oil-repellency.

Alternatively, the urethane compound may be applied to a textile product by a cleaning method, and may be applied to a textile product by, for example, a washing application or a dry cleaning method.

The textile product to be treated is typically a fabric which includes a fabric and a carpet in the form of a woven fabric, a knitted fabric, a non-woven fabric, or clothing, and may be a fiber or a yarn or an intermediate textile product (such as a sliver or a roving). The material of the textile product may be a natural fiber (such as cotton or wool), a chemical fiber (such as viscose rayon or lyocell), or a synthetic fiber (such as a polyester, polyamide, or acrylic fiber), or may be a mixture of fibers (such as a mixture of natural and synthetic fibers). The urethane compound of the present disclosure is particularly effective for making a cellulosic fiber (such as cotton or rayon) lipophobic and oil-repellent. Also, the method of the present disclosure generally makes a textile product hydrophobic and water-repellent.

Alternatively, the fibrous substrate may be leather. To make leather hydrophobic and lipophobic, the urethane compound may be applied to leather from an aqueous solution or an aqueous emulsion at various stages of leather processing, such as during the wetting processing of leather or during the finishing of leather.

Alternatively, the fibrous substrate may be paper. The urethane compound may be applied to paper which is already formed, or may be applied at various stages of papermaking, such as during the drying period of paper.

"Treatment" means applying a treatment agent (a surface-treating composition) to the treatment substrate by dipping, spraying, coating, or the like. Due to the treatment, the compound, which is the active component of the treatment agent, reaches the inside of the treatment substrate and/or adheres to the surface of the treatment substrate.

A crosslinked product of the urethane compound (a reaction product of the active component of the surface-treating agent and the urethane compound) adheres to the treatment substrate.

EXAMPLES

Next, the present invention will now be described in detail by way of Examples and Comparative Examples. However, the description of these does not limit the present disclosure.

Below, a part, %, and a ratio indicate a part by weight, % by weight, and a weight ratio, respectively, unless otherwise specified.

The test methods used below are as follows.
Shower Water-Repellency Test

A shower water-repellency test was conducted in accordance with AATCC Test Method 22-2010.

A glass funnel having a volume of at least 250 ml and a spray nozzle capable of spraying 250 ml of water for 20 seconds to 30 seconds are used. The specimen frame is a metal frame having a diameter of 15 cm. Three specimen sheets having a size of about 20 cm×20 cm are provided, and a sheet is fastened to the specimen holder frame so as not to have wrinkles. The center of the spray pattern is positioned so as to coincide with the center of the sheet. Water (250 mL)

at room temperature is poured into the glass funnel and sprayed onto the specimen sheet (for 25 seconds to 30 seconds). The holding frame is removed from the stand, one end of the holding frame is held to bring the frontal surface to face downward, and the opposite end is tapped with a solid object. The holding frame is further rotated 180°, and the same procedure is repeated to eliminate excessive droplets. The wet specimen is compared with a wet comparative standard to have a rating of 0, 50, 70, 80, 90, and 100 (water-repellency grade No.) in the order from the worst to the best water-repellency. Results are obtained from the averages of three measurements. The symbol "+" provided after a number indicates a better evaluation than what said number indicates, and the symbol "−" indicates a poorer evaluation than what said number indicates.

Oil-Repellency Test

An oil-repellency test was conducted in accordance with AATCC Test Method 118-1992.

A treated test fabric is stored for 4 hours or longer in a constant-temperature, constant-humidity apparatus having a temperature of 21° C. and a humidity of 65%. A test liquid also stored at a temperature of 21° C. is used. The test is conducted in a constant-temperature, constant-humidity chamber having a temperature of 21° C. and a humidity of 65%. 0.05 ml of the test liquid is gently dripped onto the test fabric and left to stand for 30 seconds, and then if droplets of the test liquid remain on the test fabric, the test liquid is determined to be passed. Oil-repellency is evaluated on a 9-point scale of Fail, 1, 2, 3, 4, 5, 6, 7, and 8 in the order from the poorest to the best oil-repellency, and is expressed in the numerical value of the highest-numbered passed test liquid. The symbol "+" provided after a number indicates a better evaluation than what said number indicates, and the symbol "−" indicates a poorer evaluation than what said number indicates.

| | Oil-repellency test liquid | |
| --- | --- | --- |
| Score | Test liquid | Surface tension (dyne/cm, 25° C.) |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture of n-hexadecane 35/Nujor 65 | 29.6 |
| 1 | Nujor | 31.2 |
| Fail | Fails 1 | — |

Washing Durability of Water- and Oil-Repellency

Washing in accordance with JIS L-0217-103 method is repeated 5 times, 10 times, or 15 times, and the subsequent water- and oil-repellency is evaluated (HL5, HL10, or HL15). HL0 refers to the initial water- and oil-repellency before washing.

Synthesis Example 1

To a 300 mL flask were added 32.5 g of a nurate form (NCO content 21.8%) of 1,6-hexamethylene diisocyanate, 30 g of dipropylene glycol dimethyl ether, and 4.85 g of stearyl amide ethyl alcohol, the inner temperature was raised from room temperature to 85° C. while stirring the mixture in a nitrogen atmosphere, 0.020 g of dibutyl tin dilaurate was added, and the mixture was stirred for 2 hours. Thereafter, 5 g of polyethylene glycol monomethyl ether (molecular weight 1,000) was added, the mixture was stirred for 3 hours, moreover, 14.3 g of dimethylpyrazole was added, and the mixture was stirred for 2 hours. The disappearance of NCO groups was confirmed by IR, and the mixture was cooled to room temperature. After cooling, water at 40° C. was added while vigorously stirring the mixture, stirring was performed for 10 minutes, and thus an aqueous dispersion having a solid content of 20% was produced.

Comparative Synthesis Example 1

To a 300 mL flask were added 32.5 g of diphenyl diisocyanate (NCO content 21.8%) and 30 g of dipropylene glycol dimethyl ether, the inner temperature was raised from room temperature to 85° C. while stirring the mixture in a nitrogen atmosphere, 0.020 g of dibutyl tin dilaurate was added, and the mixture was stirred for 2 hours. Thereafter, 5 g of polyethylene glycol monomethyl ether (molecular weight 1,000) was added, the mixture was stirred for 3 hours, moreover, 14.3 g of methyl ketoxime was added, and the mixture was stirred for 2 hours. The disappearance of NCO groups was confirmed by IR, and the mixture was cooled to room temperature. After cooling, water at 40° C. was added while vigorously stirring the mixture, stirring was performed for 10 minutes, and thus an aqueous dispersion having a solid content of 20% was produced.

Comparative Synthesis Example 2

To a 300 mL flask were added 32.5 g of a nurate form (NCO content 21.8%) of 1,6-hexamethylene diisocyanate, 30 g of dipropylene glycol dimethyl ether, and 4.05 g of stearyl alcohol, the inner temperature was raised from room temperature to 85° C. while stirring the mixture in a nitrogen atmosphere, 0.020 g of dibutyl tin dilaurate was added, and the mixture was stirred for 2 hours. Thereafter, 5 g of polyethylene glycol monomethyl ether (molecular weight 1,000) was added, the mixture was stirred for 3 hours, moreover, 14.3 g of dimethylpyrazole was added, and the mixture was stirred for 2 hours. The disappearance of NCO groups was confirmed by IR, and the mixture was cooled to room temperature. After cooling, water at 40° C. was added while vigorously stirring the mixture, stirring was performed for 10 minutes, and thus an aqueous dispersion having a solid content of 20% was produced.

Synthesis Example 2

To a 1,000 mL autoclave were added 65.1 g of $CF_3CF_2—(CF_2CF_2)_n—CH_2CH_2OCOC(Cl)=CH_2$ (n=2.0) (13FClA), 65.1 g of $CF_3CF_2—(CF_2CF_2)_n—CH_2CH_2OCOCH=CH_2$ (n=2.0) (13FA), 30.9 g of stearyl acrylate, 400 g of pure water, 56 g of a water-soluble glycolic solvent, 1.56 g of alkyldimethylammonium chloride, and 16.1 g of polyoxyethylene alkyl ether, and the mixture was ultrasonicated to be emulsion-dispersed at 60° C. for 15 minutes while being stirred. A flask was nitrogen-purged and then pressure-filled with 61.2 g of vinyl chloride (VCM), 0.4 g of an azo group-containing water-soluble initiator was added, the mixture was reacted at 60° C. for 20 hours, and thus an aqueous dispersion of a fluorine-containing polymer (a fluorine-containing water- and oil-repellent agent) was obtained. The composition of the polymer was nearly the same as the composition of the starting monomers.

Synthesis Example 3

To a 500 mL autoclave were added 45 g of stearyl acrylate, 5 g of isoboronyl methacrylate, 145 g of pure water, 15 g of tripropylene glycol, 1.5 g of sorbitan monooleate, 2 g of polyoxyethylene (EO: 18) secondary alkyl (C12-14) ether, and 1.5 g of dioctadecyldimethylammonium chloride were added, and the mixture was ultrasonicated to be emulsion-dispersed at 60° C. for 15 minutes while being stirred. The autoclave was nitrogen-purged, then 0.5 g of 2,2-azobis(2-amidinopropane) dihydrochloride was added, the mixture was reacted at 60° C. for 3 hours, and thus an aqueous dispersion of a fluorine-free polymer was obtained. Moreover, the solid content was adjusted to 30% with pure water. The monomer composition of the produced polymer was nearly the same as the starting composition of the monomers.

Example 1

The fluorine-containing water- and oil-repellent agent obtained in Synthesis Example 2 (a water- and oil-repellent agent in which a fluorine-containing acrylic polymer having a $C_6$ perfluoroalkyl group is an active component) was diluted with water to 4%, the aqueous dispersion obtained in Synthesis Example 1 was added so as to be 1%, and the mixture was uniformly stirred. Ten nylon woven fabrics (500 mm×200 mm) and cotton fabrics (500 mm×200 mm) were continuously dipped in this test liquid, passed through a mangle, and processed with a pin tenter at 170° C. for 1 minute. Then, each of the nylon woven fabrics and cotton fabrics was subjected to a shower water-repellency test, an oil-repellency test, and a washing durability test therefor. The results are shown in Table A.

Comparative Examples 1 and 2

The same procedure as in Example 1 was repeated except that the aqueous dispersion obtained in Comparative Synthesis Example 1 (Comparative Example 1) or Comparative Synthesis Example 2 (Comparative Example 2) was used in place of the aqueous dispersion obtained in Synthesis Example 1. The results are shown in Table A.

Example 2

The same procedure as in Example 1 was repeated except that the aqueous dispersion of a fluorine-free polymer obtained in Synthesis Example 3 was used in place of the aqueous dispersion of a fluorine-containing polymer obtained in Synthesis Example 2. The results are shown in Table A.

Comparative Examples 3 and 4

The same procedure as in Example 2 was repeated except that the aqueous dispersion obtained in Comparative Synthesis Example 1 (Comparative Example 3) or Comparative Synthesis Example 2 (Comparative Example 4) was used in place of the aqueous dispersion obtained in Synthesis Example 1. The results are shown in Table A.

TABLE A

|  |  |  | Example 1 | Comparative Example 1 | Comparative Example 2 | Example 2 | Comparative Example 3 | Comparative Example 4 |
|---|---|---|---|---|---|---|---|---|
|  |  |  | Fluorine-containing repelent agent | | | Fluorine-free repellent agent | | |
| Repellent agent | | | 5.00% | 5.00% | 5.00% | 4.00% | 4.00% | 4.00% |
| Comparative Synthesis Example 1 | | | — | 1.00% | — | — | 1.00% | — |
| Synthesis Example 1 | | | 1.00% | — | — | 1.00% | — | — |
| Comparative Synthesis Example 2 | | | — | — | 1.00% | — | — | 1.00% |
| Water-repellency AATCC-22 | 100% Cotton White | HL0 | 100 | 100 | 100 | 100 | 100 | 100 |
|  |  | HL5 | 100 | 100 | 100 | 95 | 90 | 90 |
|  |  | HL10 | 100 | 100 | 100 | 75 | 75 | 75 |
|  |  | HL15 | 85 | 75 | 80 | 70 | 60 | 60 |
|  | 100% Cotton Beige | HL0 | 100 | 100 | 100 | 100 | 100 | 100 |
|  |  | HL5 | 100 | 85 | 95 | 95 | 80 | 90 |
|  |  | HL10 | 100 | 75 | 85 | 70 | 70 | 70 |
|  |  | HL15 | 85 | 70- | 80 | 60 | 50 | 50 |
|  | Nylon taffeta | HL0 | 100 | 100 | 100 | 100 | 100 | 100 |
|  |  | HL5 | 100 | 100 | 100 | 100 | 90 | 90 |
|  |  | HL10 | 100 | 100 | 100 | 90 | 80 | 80 |
|  |  | HL15 | 85 | 85 | 85 | 80 | 70 | 70 |
| Oil-repellency AATCC-118 | 100% Cotton White | HL0 | 6- | 6- | 6- | — | — | — |
|  |  | HL5 | 5 | 5 | 5 | — | — | — |
|  |  | HL10 | 5 | 5 | 5 | — | — | — |
|  |  | HL15 | 5 | 5 | 5 | — | — | — |
|  | 100% Cotton Beige | HL0 | 6 | 6 | 6 | — | — | — |
|  |  | HL5 | 5 | 5 | 5 | — | — | — |
|  |  | HL10 | 5 | 5 | 5 | — | — | — |
|  |  | HL15 | 5 | 4 | 4 | — | — | — |
|  | Nylon taffeta | HL0 | 6 | 6 | 6 | — | — | — |
|  |  | HL5 | 4.5 | 4.5 | 4.5 | — | — | — |
|  |  | HL10 | 4 | 4 | 4 | — | — | — |
|  |  | HL15 | 4 | 4 | 4 | — | — | — |

INDUSTRIAL APPLICABILITY

The urethane composition of the present disclosure can be used as a cross-linking agent or an adjuvant. The urethane composition of the present disclosure can be used with a surface-treating agent, and can enhance the efficacy of the surface-treating agent and improve the durability of the efficacy (particularly, washing durability).

What is claimed is:

1. An aqueous urethane composition comprising:
   (A) a urethane compound, and
   (B) water;
   wherein
   the urethane compound (A) comprises units formed from:
   (A1) an isocyanate, and
   (A2) a long-chain alcohol represented by the formula:

HO—Z(Y—R)$_n$ wherein
   R is each independently a hydrocarbon group having 7 to 40 carbon atoms,
   Y is each independently —O—, —NH—, —NH—C(=O)—, —C(=O)—NH—, —NH—C(=O)—O—, —NH—C(=O)—NH—, —C$_6$H$_4$—, —NH—(CH$_2$)$_m$—NH—, —NH—(CH$_2$)$_m$—O—, —O—C(=O)—, —C(=O)—O—, —NH—(CH$_2$)$_m$—O—C(=O)—, —NH—(CH$_2$)$_m$—C(=O)—O—, —O—C(=O)—NH—, —O—C$_6$H$_4$—, —NH—S(=O)$_2$—, —S(=O)$_2$—NH—, —NH—(CH$_2$)$_m$—O—C(=O)—NH—, —NH—(CH$_2$)$_m$—NH—C(=O)—O—, —NH—(CH$_2$)$_m$—C(=O)—NH—, —NH—(CH$_2$)$_m$—NH—C(=O)—, —NH—(CH$_2$)$_m$—NH—C(=O)—NH—, —NH—(CH$_2$)$_m$—O—C$_6$H$_4$—, —NH—(CH$_2$)$_m$—NH—C$_6$H$_4$—, —NH—(CH$_2$)$_m$—NH—S(=O)$_2$—, or —NH—(CH$_2$)$_m$—S(=O)$_2$—NH—,
   wherein m is an integer of 1 to 5,
   Z is a direct bond or a divalent hydrocarbon group having 1 to 5 carbon atoms, and
   n is 1.

2. The aqueous urethane composition according to claim 1, further comprising a unit formed from at least one selected from:
   (A3) a blocking agent, and
   (A4) an alcohol compound.

3. The aqueous urethane composition according to claim 1, wherein the isocyanate (A1) is at least one selected from tolylene diisocyanate (TDI), diphenylmethane diisocyanate (MDI), an MDI oligomer, naphthalene-1,5-diisocyanate, xylylene diisocyanate, hexamethylene diisocyanate (HDI), 4,4-dicyclohexylmethane diisocyanate, norbornane diisocyanate, isophorone diisocyanate (IPDI), an adduct of diisocyanate, an allophanate-modified product, a biuret-modified product, an isocyanurate-modified product or a carbodiimide-modified product, and a urethane prepolymer.

4. The aqueous urethane composition according to claim 1, wherein the long-chain alcohol (A2) is at least one selected from:

HO—(CH$_2$)$_m$—NH—C(=O)—R,
HO—(CH$_2$)$_m$—C(=O)—NH—R,
HO—(CH$_2$)$_m$—O—C(=O)—R,
HO—(CH$_2$)$_m$—C(=O)—O—R,
HO—(CH$_2$)$_m$—NH—C(=O)—O—R,
HO—(CH$_2$)$_m$—O—C(=O)—NH—R,
HO—(CH$_2$)$_m$—NH—C(=O)—NH—R,
HO—(CH$_2$)$_m$—NH—S(=O)$_2$—R, and
HO—(CH$_2$)$_m$—S(=O)$_2$—NH—R, wherein R is a hydrocarbon group having 12 to 30 carbon atoms, and m is an integer of 1 to 5.

5. The aqueous urethane composition according to claim 2, wherein the blocking agent (A3) is at least one selected from oxime, phenol, alcohol, mercaptan, amide, imide, imidazole, urea, amine, imine, pyrazole, and an active methylene compound.

6. The aqueous urethane composition according to claim 2, wherein
   the alcohol compound (A4) is a monool or a polyol,
   the monool is a compound obtained by adding a C$_2$ or C$_3$ alkylene oxide to a starting monoalcohol having 1 to 10 carbon atoms, and
   the polyol is a diol or a polyol having 3 or more hydroxyl groups, and is at least one selected from a low molecular weight polyol, a polyether polyol, a polyester polyol, a polyester polycarbonate polyol, and a crystalline or non-crystalline polycarbonate polyol.

7. The aqueous urethane composition according to claim 1, wherein the aqueous urethane composition is a urethane mixture comprising the urethane compound (A), and at least one selected from the group consisting of the polyisocyanate (A1), the long-chain alcohol (A2), the blocking agent (A3), and the alcohol compound (A4).

8. The aqueous urethane composition according to claim 1, wherein the aqueous urethane composition is an aqueous dispersion.

9. The aqueous urethane composition according to claim 1, wherein the aqueous urethane composition is a cross-linking agent or an adjuvant.

10. A method for producing the aqueous urethane composition according to claim 1, the method comprising:
    mixing the isocyanate (A1) and the long-chain alcohol (A2) in an organic solvent to react the isocyanate (A1) and the long-chain alcohol (A2), and subsequently
    mixing the reaction product with water.

11. A method for treating a substrate, the method comprising:
    treating a substrate the aqueous urethane composition according to claim 1.

12. A treated textile product, comprising the urethane compound in the aqueous urethane composition according to claim 1 attached as a crosslinked product to a treatment substrate.

* * * * *